US008904447B1

(12) United States Patent
Verhage et al.

(10) Patent No.: US 8,904,447 B1
(45) Date of Patent: Dec. 2, 2014

(54) VIDEO CAMPAIGN AUTOMATIC CONFIGURATION

(75) Inventors: Alexander J. Verhage, Oakland, CA (US); Jonathan Goldman, San Francisco, CA (US); Thomas J. Broxton, San Francisco, CA (US); Michael Hatscher, Zurich (CH); Phuong B. Le, Belmont, CA (US); Baljeet Singh, San Francisco, CA (US)

(73) Assignee: Google Inc., Mountain View, CA (US)

( * ) Notice: Subject to any disclaimer, the term of this patent is extended or adjusted under 35 U.S.C. 154(b) by 525 days.

(21) Appl. No.: 13/242,582

(22) Filed: Sep. 23, 2011

(51) Int. Cl.
*H04N 5/445* (2011.01)

(52) U.S. Cl.
USPC .................. 725/59; 725/37; 725/38; 725/42; 725/43; 725/46; 725/47; 725/91; 725/92

(58) Field of Classification Search
USPC .................. 725/37–38, 42–43, 46–47, 91–92
See application file for complete search history.

(56) References Cited

U.S. PATENT DOCUMENTS

| | | | |
|---|---|---|---|
| 7,069,332 B2 | 6/2006 | Shibata et al. | |
| 7,117,439 B2 | 10/2006 | Barrett et al. | |
| 7,984,466 B2 | 7/2011 | Eldering et al. | |
| 8,160,923 B2 | 4/2012 | Taylor et al. | |
| 8,310,443 B1 * | 11/2012 | Pan | 345/156 |
| 8,332,892 B2 * | 12/2012 | Rafey et al. | 725/49 |
| 2008/0109298 A1 * | 5/2008 | Barton | 705/10 |
| 2008/0115161 A1 * | 5/2008 | Kurzion | 725/32 |
| 2008/0276185 A1 * | 11/2008 | Pry | 715/760 |

OTHER PUBLICATIONS

'Wikipedia' [online]. "Video Advertising," 2010, [retrieved on Jul. 2, 2012]. Retrieved from the Internet: URL:<http://web.archive.org/web/20110226144105/http://en.wikipedia.org/wiki/Video_advertising>. 1 page.
'Wikipedia' [online] "Video," 2010, [ retrieved on Jul. 2, 2012]. Retrieved from the Internet: URL: http://web.archive.org/web/20100312001423/http://en.wikipedia.org/wiki/Video#Video_formats. 8 pages.

* cited by examiner

*Primary Examiner* — Mulugeta Mengesha
(74) *Attorney, Agent, or Firm* — Lowenstein Sandler LLP

(57) ABSTRACT

Methods, systems, and apparatus, including computer programs encoded on a computer-readable storage medium, for automatically preparing content. A method includes receiving a selection of a video content item for distribution by a content distribution system as part of a campaign; prompting a user to determine if the user wants control over formats and networks the video content item will be displayed in; receiving a user selection that the user wants automatic format and network selection; receiving attribute information from the user for use in presenting the video content item in accordance with the received selection for automatic format and network selection; automatically preparing the video content item for distribution in a predetermined number of formats and across a predetermined number of networks including determining a distribution among the formats and the networks consistent with a first predetermined criteria; and storing the campaign.

21 Claims, 7 Drawing Sheets

VIDEO CAMPAIGN AUTOMATIC CONFIGURATION

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

Content sponsors can create campaigns that define the parameters for when and how their content items are presented. Controls can be provided for the content sponsor to identify one or more content items for distribution and to specify targeting parameters along with a bid. A content management system can facilitate the presentation of the content items in accordance with the parameters associated with a given campaign.

SUMMARY

In general, one innovative aspect of the subject matter described in this specification can be implemented in methods that include a method for automatically preparing content. The method comprises: receiving a selection of a video content item for distribution by a content distribution system as part of a campaign; prompting a user to determine if the user wants control over formats and networks the video content item will be displayed in; receiving a user selection that the user wants automatic format and network selection; receiving attribute information from the user for use in presenting the video content item in accordance with the received selection for automatic format and network selection; automatically preparing the video content item for distribution in a predetermined number of formats and across a predetermined number of networks including determining a distribution among the formats and the networks consistent with a first predetermined criteria; and storing the campaign.

These and other implementations can each optionally include one or more of the following features. The pre-determined formats can be selected, for example, from the group of search-result-embedded format, selected-from-group format, in-display format, and stream-embedded format. The search-result-embedded format can include video content items that include a user-selectable thumbnail image or icon that is embedded inside a search result. The selected-from-group format can include video content items that are user-selectable from a group of thumbnails of video content items. The in-display format can include video content items that appear as a user-selectable thumbnail within a banner or other display. The stream-embedded format can include video content items that play before, during or after video content viewed by a user. Determining a distribution can include determining a distribution to deliver the video content consistent with campaign goals. The method can include: receiving a selection that the user wants control over at least a portion of the formats and the networks; receiving a selection of one or more formats to exclude from a predetermined set of formats for the video content item; and presenting a list of attributes required to be provided to complete the campaign. Receiving attribute information from the user can include input satisfying the list and automatically preparing the video content item for distribution can include preparing the video content item for distribution in only select ones of the predetermined set of formats. The method can include: receiving a selection that the user wants control over at least a portion of the formats and the networks; receiving selections to exclude one or more of the predetermined networks; and presenting a list of attributes required to be provided to complete the campaign. Receiving attribute information from the user can include input satisfying the list and automatically preparing the video content item for distribution can include preparing the video content item for distribution to only select ones of the predetermined set of networks. The method can include: receiving a selection that the user wants control over at least a portion of the formats and the networks; receiving a selection of one or more formats to exclude from a predetermined set of formats for the video content item; and displaying a filtered list of networks that includes networks in the predetermined set of networks which support the selected formats. The method can include: receiving selections to exclude one or more of the networks in the filtered list of networks; and presenting a list of attributes required to be provided to complete the campaign. Receiving attribute information from the user can include input satisfying the list. Automatically preparing the video content item for distribution can include preparing the video content item for distribution in only the selected formats and to only the selected networks.

In general, another aspect of the subject matter described in this specification can be implemented in methods that include a method for automatically preparing content. The method comprises: identifying one or more predetermined formats for use in distributing a video content item by a content distribution system as part of a campaign; identifying one or more predetermined networks for use in distributing the video content item by the content distribution system as part of the campaign; and providing data that cause presentation of a user interface that includes a selection tool for specifying formats, networks and attributes to be associated with the video content item and used in the distribution of the video content item by the content distribution system where the user interface includes a selectable control for enabling the user to designate automatic selection of the predetermined formats and predetermined networks for use in the campaign or manual configuration from among the predetermined formats and predetermined networks.

These and other implementations can each optionally include one or more of the following features. The pre-determined formats can be selected from the group of search-result-embedded format, selected-from-group format, in-display format, and stream-embedded format. The search-result-embedded format can include video content items that include a user-selectable thumbnail image or icon that is embedded inside a search result. The selected-from-group format can include video content items that are user-selectable from a group of thumbnails of video content items. The in-display format can include video content items that appear as a user-selectable thumbnail within a banner or other display. The stream-embedded format can include video content items that play before, during or after video content viewed by a user. The method can include: receiving a selection that the user wants to manually configure at least a portion of the formats and the networks; receiving a selection of one or more formats to exclude from a predetermined set of formats for the video content item; presenting a list of attributes required to be provided to complete the campaign; receiving attribute information from the user including receiving input satisfying the list; and automatically preparing the video content item for distribution including preparing the video content item for distribution in only select ones of the predetermined set of formats. The method can include: receiving a selection that the user wants to manually configure at least a portion of the formats and the networks; receiving selections to exclude one or more of the predetermined networks; presenting a list of attributes required to be provided to complete the campaign; receiving attribute information from the user including receiving input satisfying the list; and automatically preparing the video content item for distribution including preparing the video content item for distribution to only select ones of the predetermined set of networks.

In general, another aspect of the subject matter described in this specification can be implemented in computer program products that include a computer program product embodied in a tangible medium that when executed by a processor cause the processor to: receive a selection of a video content item for distribution by a content distribution system as part of a campaign; prompt a user to determine if the user wants control over formats and networks the video content item will be displayed in; receive a user selection that the user wants automatic format and network selection; receive attribute information from the user for use in presenting the video content item in accordance with the received selection for automatic format and network selection; automatically prepare the video content item for distribution in a predetermined number of formats and across a predetermined number of networks including determining a distribution among the formats and the networks consistent with a first predetermined criteria; and store the campaign.

In general, another aspect of the subject matter described in this specification can be implemented in systems that include a system for automatically preparing content. A system includes a content distribution system, a video sharing environment that hosts video content items that are downloadable and viewable by user devices, and an account management user interface for creating and managing content campaigns. The account management user interface is configured, upon receiving a selection of a video content item for distribution by the content distribution system as part of a campaign, to prompt a user to determine if the user wants control over formats and networks the video content item will be displayed in, receive a user selection that the user wants automatic format and network selection, and receive attribute information from the user for use in presenting the video content item in accordance with the received selection for automatic format and network selection. The content distribution system is configured to automatically prepare the video content item for distribution in a predetermined number of formats and across a predetermined number of networks including determining a distribution among the formats and the networks consistent with a first predetermined criteria, and to store the campaign.

Particular implementations may realize one or more of the following advantages. A user can, for a campaign, either designate a content distribution system to automatically select formats and networks a video content item will be displayed or can select which formats and networks the video content item will be displayed in, from supported format and network combinations. A video content item can be prepared for a content campaign based on receiving from the user a minimum number of attributes that are required to prepare the video content item in all selected formats and networks. A user can have a video content item automatically prepared for a campaign without having to understand details of available formats and networks.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A selection of a video content item for distribution by a content management system as part of a campaign can be received, such as from a campaign sponsor. The campaign sponsor can be prompted to determine if the campaign sponsor wants control over formats and networks the video content item will be displayed in. A campaign setting selection can be received, for example, that indicates that the campaign sponsor wants automatic format and network selection. Attribute information can be received from the campaign sponsor for use in presenting the video content item in accordance with the received selection. The video content item can be automatically prepared for distribution in a predetermined number of formats and across a predetermined number of networks including determining a distribution among the formats and the networks consistent with a first predetermined criteria. As another example, a selection can be received that indicates that the campaign sponsor wants control over formats and networks. The campaign sponsor can select one or more formats and one or more networks. The video content item can be prepared for distribution in the selected formats to the selected networks. Information can be stored for the campaign, including campaign settings and the prepared video content item.

Figure 1:
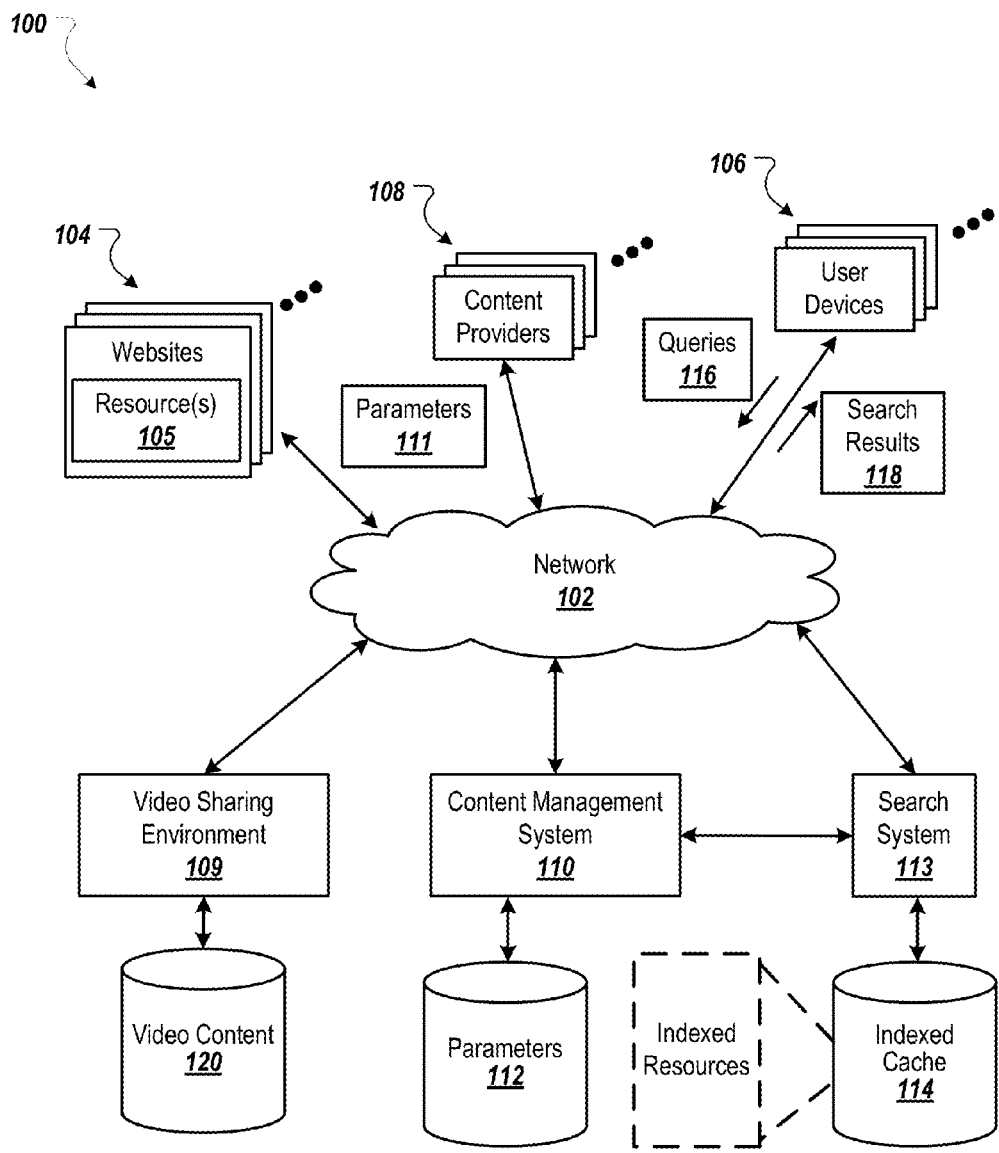
FIG. 1 is a block diagram of an example environment for providing content to a user.

FIG. 1 is a block diagram of an example environment 100 for providing content to a user. The example environment 100 includes a network 102, such as a local area network (LAN), a wide area network (WAN), the Internet, or a combination thereof. The network 102 connects websites 104, user devices 106, content providers 108, publishers, a video sharing environment 109, and a content management system 110. The example environment 100 may include many thousands of websites 104, user devices 106, and content providers 108. The content management system 110 may be used for selecting and providing content in response to requests for content. The content providers 108 can be, for example, advertisers. Other types of content providers are possible.

A content provider 108 or content sponsor can create a content campaign associated with one or more video content items using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device. The content provider 108 can create, for example, a video campaign or some other type of campaign.

The content provider 108 can, using the account management user interfaces, provide campaign parameters 111 which define the content campaign. The campaign parameters 111 can be stored in a parameters data store 112. Campaign parameters 111 can include, for example, a campaign name, a preferred content network for placing content, a budget for the campaign, start and end dates for the campaign, a schedule for content placements, content (e.g., a creative, such as video content), and targeting criteria. Targeting criteria can include, for example, a targeted language, one or more targeted geographical locations or websites, and one or more targeting terms. The content campaign can be created and activated for the content provider 108 according to the parameters 111 specified by the content provider 108.

The content provider 108 can provide or identify one or more video content items to be used for one or more video campaigns. The content provider 108 can use the account management interface to specify, for a video campaign (or for one or more particular video content items), whether the content provider 108 wants the content management system 110 to automatically prepare the video content items in a predetermined number of supported formats and across a predetermined number of supported networks, or whether the content provider 108 wants control over the formats and networks in which the video content item will be displayed.

For example, the content management system 110 can receive a selection that indicates that the content provider 108 wants automatic format and network selection. The content provider 108 can provide attribute information for use in presenting the video content items in the supported formats and on the supported networks. The content management system 110 can automatically prepare the video content items for distribution in the supported formats and across the supported networks and can distribute a campaign budget across format and network combinations. For example, the campaign budget can be distributed evenly across the format and network combinations or the campaign budget can be distributed according to some other algorithm, such as an algorithm that allocates budget amounts according to how presenting a video content item in a particular format and on a particular network might meet one or more goals of the campaign, as compared to other format and network combinations.

As another example, the content management system 110 can receive a selection that indicates the content provider 108 wants control over at least a portion of the supported formats and the supported networks. The content provider 108 can, for example, select one or more formats to exclude and/or can select one or more networks to exclude (e.g., where the video content items are not displayed, in the campaign, in an excluded format or on an excluded network). The content management system 110 can present a list of attributes required to be provided to prepare the video content items for the remaining formats and networks. The content management system 110 can use the provided attributes to automatically prepare the video content items for distribution in only the selected formats and to only the selected networks.

Different types of video formats can exist, including, but not limited to a search-result-embedded format (e.g., a video that is provided as part of a search result), a selected-from-group format (e.g., a video that is provided in response to a selection made from a slate of available videos), an in-display format (e.g., a video that is provided as a user-selectable thumbnail within a banner or other display), or a stream-embedded format (e.g., a video that is provided before, during or after another content item in a stream). Other types of formats other than video formats can be used, for example, an audio-only format or an audio format that is used with a static image.

Each video format can provide a different context in which a video content item is presented. By way of example, search-result-embedded videos can include videos that consist of a user-selectable thumbnail image or icon that appears inside a search result. Selected-from-group videos can include videos that result from user selection of a single thumbnail from a group (or slate) of thumbnails of videos. In-display videos can include videos that appear as a user-selectable thumbnail in banner (e.g., at the top of a web page) or in some other type of display. Stream-embedded videos can include short (e.g., 15-second, 30-second, etc.) videos that play before, during or after other video content (e.g., referred to as "pre-rolls," "mid-rolls," or "post-rolls"). Other formats are possible.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as JavaScript scripts).

To facilitate searching of resources 105, the environment 100 can include a search system 113 that identifies the resources 105 by crawling and indexing the resources 105 provided by the content publishers on the websites 104. Data about the resources 105 can be indexed based on the resource 105 to which the data corresponds. The indexed and, optionally, cached copies of the resources 105 can be stored in an indexed cache 114.

A user device 106 is an electronic device that is under control of a user and is capable of requesting and receiving resources 105 over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

The video sharing environment 109 allows users, using the user devices 106, and content providers 108 to upload and make available video content items. The video sharing environment 109 may include, for example, multiple channels, where each channel may be associated, for example, with one or more content providers 108, one or more particular users, or a particular type of video content. The content provider 108 can, for example, associate one or more targeting keywords with each video content item that is included in a video campaign and/or can associate a video content item in a video campaign with one or more user video content items that are stored in a repository 120.

A user device 106 can, for example, request resources 105 from a website 104. In turn, data representing the resource 105 can be provided to the user device 106 for presentation by the user device 106. As another example, a user device 106 can request a video content item hosted by the video sharing environment 109. As yet another example, user devices 106 can submit search queries 116 to the search system 113 over the network 102.

In response to a search query 116, the search system 113 can access the indexed cache 114 to identify resources 105 that are relevant to the search query 116. The search system 113 identifies the resources 105 in the form of search results 118 and returns the search results 118 to the user devices 106 in one or more search results pages. In some implementations, a search result 118 is data generated by the search system 113 that identifies a resource 105 that is responsive to a particular search query 116, and includes a link to the resource 105. An example search result 118 can include a web page title or video title, a snippet of text or a portion of an image extracted from the web page or video, and the URL (Unified Resource Location) of the web page.

A request for content can be received by the content management system 110 from a user device 106. The request for content can be associated with, for example, a request for a resource 105, a search query 116, or request for a particular video content item. The content management system 110 can select one or more content items to provide in response to the request. For example, the request for content can include characteristics (e.g., size, supported media types) of one or more content "slots" that are defined for the requested resource 105 or search results page. As another example, resource keywords associated with a requested resource 105 or a search query 116 can be provided to the content management system 110. Content items selected by the content management system 110 can include video content items or other content items having characteristics matching the characteristics of content slots and that are identified as relevant to specified resource keywords or search queries 116. For example, content items having targeting keywords that match the resource keywords or the search query 116 can be selected by the content management system 110. The content management system 110 can also select content items at least in part based on the results of an auction.

Figure 2:
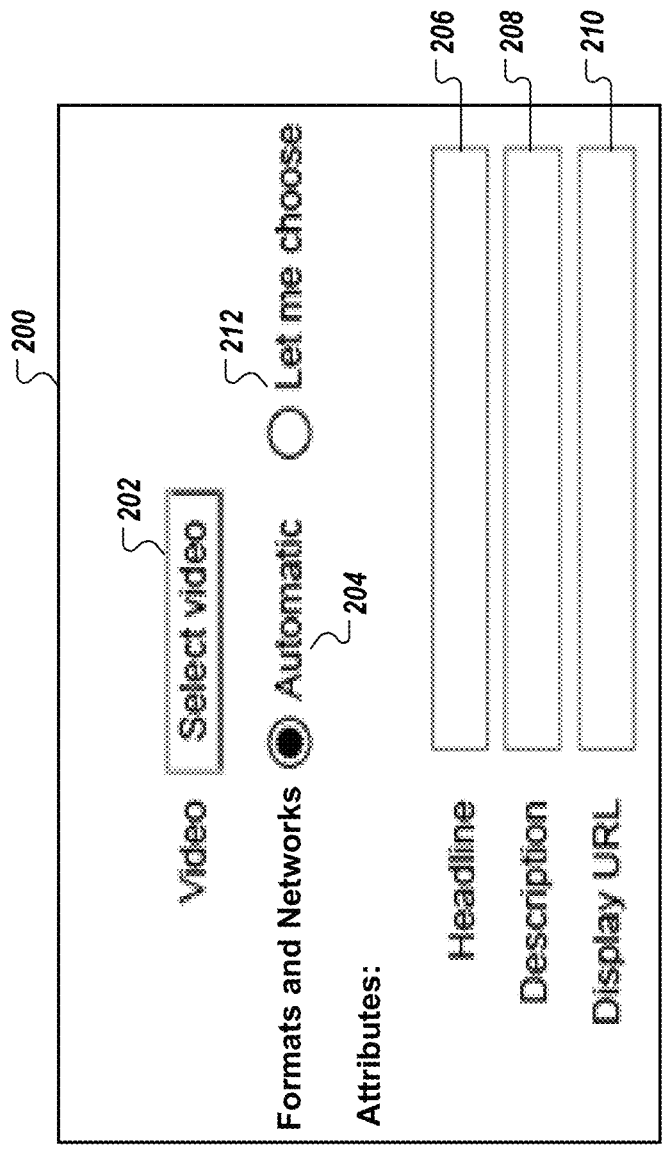
FIGS. 2 and 3 illustrate example user interfaces.

FIG. 2 illustrates an example user interface 200. The user interface 200 can be included, for example, in one or more user interfaces that a campaign sponsor can use to configure a campaign, such as a video campaign. The user interface 200 includes a control 202 which a campaign sponsor can use to select a video (e.g., a video to be included in a video campaign).

The campaign sponsor can select a control 204 to indicate that the campaign sponsor wants automatic format and network selection. The campaign sponsor can provide attribute information, such as a headline (e.g., title), description, and a display URL (Uniform Resource Locator, such as an address of a landing page) using controls 206, 208, and 210, respectively. The user interface 200 can include, for example, a set of controls which allow the campaign sponsor to provide a minimal number of attributes and/or assets which can be used to prepare the selected video for distribution. The selected video can be automatically prepared for distribution in a predetermined number of formats and across a predetermined number of networks.

For example, the video can be prepared for distribution for a predefined set of format and network combinations where each format and network included in a format and network combination is chosen from the predefined formats and the predefined networks, respectively. The received attributes can enable preparation of the video for any of the predefined format and network combinations. If the campaign sponsor wants control over formats and networks the video content item will be displayed in, the campaign sponsor can select a control 212. In response to selection of the control 212, the user interface 200 can be updated to include controls which enable the campaign sponsor to select or exclude one or more formats and one or more networks.

Figure 3:
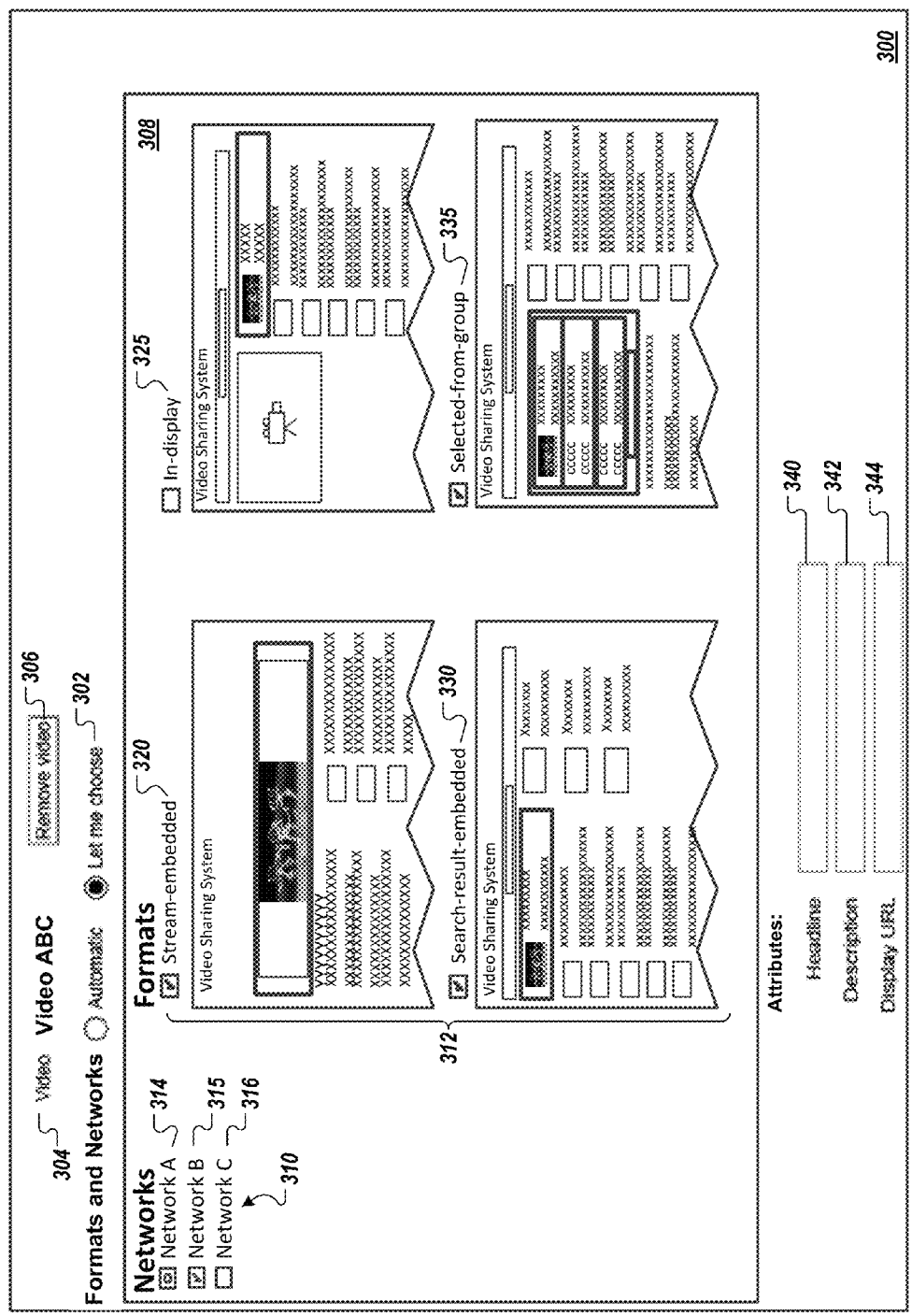

For example, FIG. 3 illustrates an example user interface 300 for selecting or excluding formats and networks. A control 302, which corresponds to the control 212, is selected. A control 304 displays the title of the selected video. The campaign sponsor can select a control 306 to remove the selection of the video (e.g., to update the user interface 300 to appear similar to the user interface 200, which the user can use to select a video).

In response to selection of the control 302, a formats and networks area 308 is displayed. The formats and networks area 308 includes a networks list 310 and a set of formats 312. The networks list 310 includes a network A 314, a network B 315, and a network C 316, where each of the networks A, B, and C are different types of networks. For example, the network A can be a video sharing service and the network C can be a display network that includes a set of publisher web sites. Networks can be added to or removed from the networks list 310, based on which networks the content management system 110 supports.

In the example shown, the formats 312 include a stream-embedded format 320, an in-display format 325, a search-result-embedded format 330, and a selected-from-group format 335. Other formats are possible. A video in the stream-embedded format 320 can be a video that is provided before, during or after another content item in a stream. A video in the in-display format 325 can be a video that is provided as a user-selectable thumbnail within a banner or other display. A video in the search-result-embedded format 330 can be a video that is provided as part of a search result. A video in the selected-from-group format 335 can be a video that is provided in response to a selection made from a group (e.g., slate) of available videos.

Formats can be added to or removed from the formats 312, based on which formats the content management system 110 supports. The user interface 300 can display other settings related to the selected video content item. For example, the user interface 300 can include a content placement area which allows the campaign sponsor to select content placement areas (e.g., left, top, right, bottom) in which the campaign sponsor wants the video content item to appear, for example, relative to a web page or other resource in which the video content item is to be included. In such an example, the campaign sponsor can configure various format, network, and content placement combinations for the selected video content item.

The campaign sponsor can interact with the formats 312 to select or exclude formats and can interact with the networks list 310 to select or include networks. In some implementations, when the user interface 300 is first displayed for a particular video, all formats and all networks can be selected by default. A campaign sponsor can, for example, deselect one or more of the formats 312 if the campaign sponsor wants to exclude those formats from the campaign. For example, in-display format 325 is not selected. The stream-embedded format 320, the search-result-embedded format 330, and the selected-from-group format 335 are selected. As another example, the campaign sponsor can deselect one or more of the networks 314, 315, or 316. For example, the network 316 is not currently selected.

In some implementations, the user interface 300 indicates relationships between formats and networks. For example, particular formats may be applicable only on certain networks. For example, the search-result embedded format 330 may only be applicable in a video search network. As the user selects or deselects formats 312, applicable networks in the network list 310 can be automatically and correspondingly selected or deselected, based on one or more predefined relationships between the formats 312 and the networks in the network list 310. For example, if the network B 315 is a video search network, the network B 315 may be automatically deselected if the campaign sponsor deselects the search-result-embedded format 330, to indicate to the campaign sponsor that the network B 315 is no longer applicable.

As another example, some networks can support multiple formats 312. For example, the network 314 may be a display network that supports multiple formats 312. If the user deselects one of the formats 312 that is supported by the network 314, the network 314 can appear "partially selected" in the network list 310. For example, a partially selected network can appear in the network list 310 with an associated control that is neither selected (e.g., checked) nor unselected (e.g., unchecked), but that is partially selected (e.g., a partially filled checkbox, as shown for the network 314). The partially selected network 314 can indicate, based on the current selections, that the network 314 is configured to be used for the selected video for only some of the formats that the network 314 supports.

The user interface 300 includes attribute controls 340, 342, and 344, which correspond to the controls 206, 208, and 210 described above with respect to FIG. 2. The controls 340, 342, and 344 can be used to provide attributes that are used to prepare the selected video for distribution in the selected formats and across the selected networks. The particular attribute controls that are shown can be based on the selected formats and networks. For example, if a particular attribute is needed for preparing the selected video for distribution in the selected formats and across the selected networks, an attribute control for that attribute can be shown, otherwise the attribute control for that attribute can be hidden, removed from, or otherwise not shown in the user interface 300.

Figure 4:
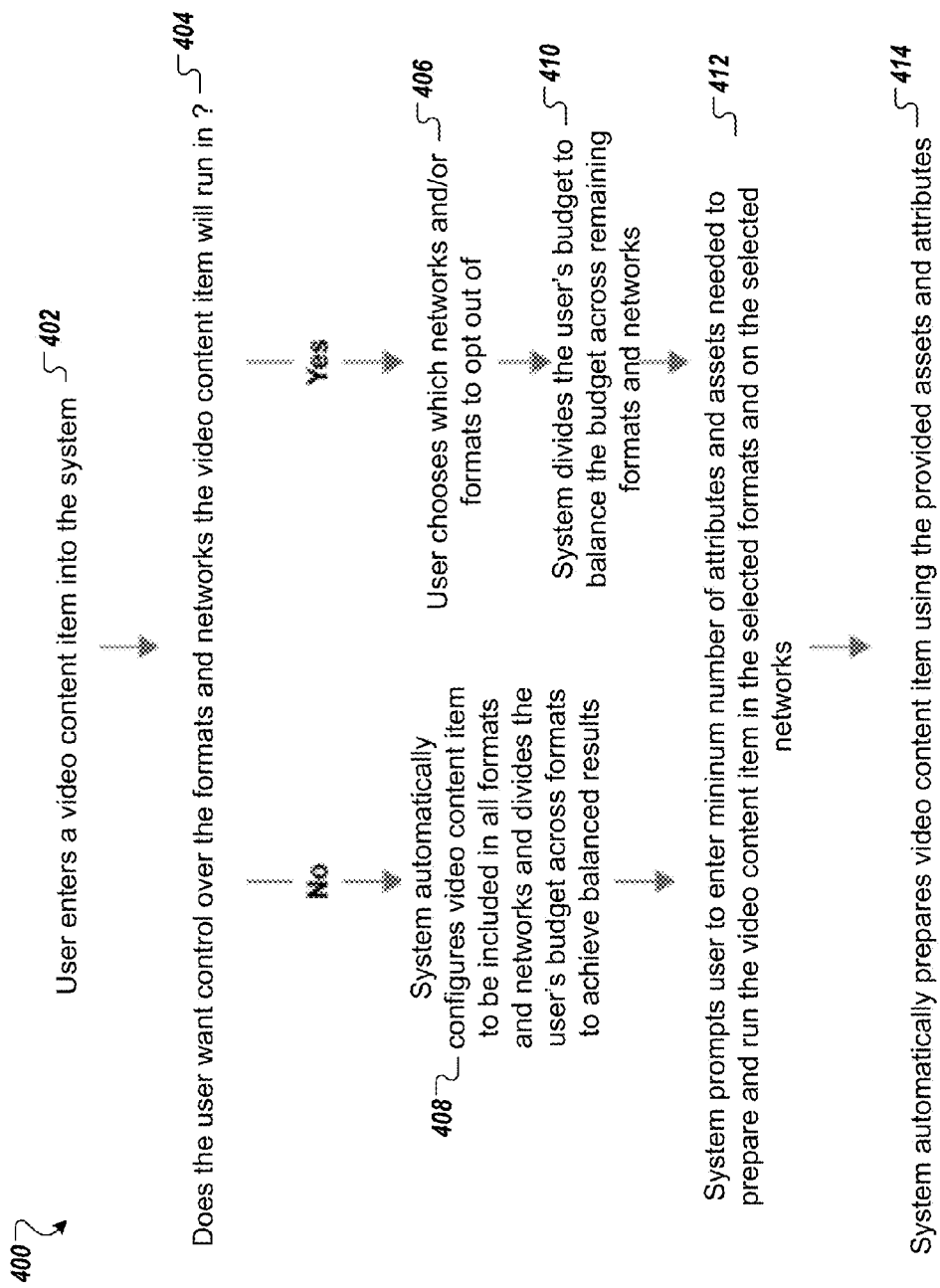
FIG. 4 is a flowchart of an example process for automatically preparing content.

FIG. 4 is a flowchart of an example process 400 for automatically preparing content. The process 400 can be performed, for example, by the content management system 110 described above with respect to FIG. 1.

A user enters, selects, or otherwise identifies a video content item for presentation by the system (402). For example, with respect to FIG. 2, the user can select a video using the control 202.

The user is prompted whether the user wants control over formats and networks the video content item will run in (404). For example, with respect to FIG. 2, the user can be presented with the controls 204 and 212, where the user can select the control 212 if the user wants control over the formats and networks the video content item will run in and can select the control 204 if the user does not want control over which formats and networks the video content item will run.

In some implementations, if the user does not want control over formats and networks, the system automatically configures the video content item to be included in all supported formats and networks and divides the user's budget across the supported formats and networks to achieve balanced results (406). For example, a campaign budget can be distributed evenly across network and format combinations formed from the selected formats and networks or the campaign budget can be distributed according to some other algorithm, such as an algorithm that allocates budget amounts according to how presenting a video content item in a particular format and on a particular network might meet one or more goals of the campaign, as compared to other format and network combinations.

If the user does want control over formats and networks, the user chooses which networks and/or formats to opt out of (408). For example, in response to the user selecting the control 212, the user interface 300 described above with respect to FIG. 3 can be displayed. The user can, using the user interface 300, select one or more formats to exclude and/or can select one or more networks to exclude.

The system divides the user's budget, for example, to balance the budget across remaining formats and networks (410). For example, as described above, a campaign budget can be evenly distributed across format and network combinations that are formed from the remaining format and network combinations.

The system prompts the user to enter a minimum number of attributes and assets needed to prepare and run the video content item in the selected formats and on the selected networks (412). For example, as shown in FIG. 3, one or more attribute controls can be displayed which allow the user to enter attributes to be used for preparing the selected video for distribution in the selected formats and across the selected networks. An attribute can be received, for example, if the attribute is needed to prepare the selected video in at least one format or for at least one network.

In some implementations, the system automatically prepares the video content item using the provided assets and attributes (414). For example, the content management system 110 can prepare a video content item for each network and format combination that can be formed from the selected networks and formats. In some implementations, the user can preview a video content item in some or all of network and format combinations that can be formed from the selected formats and networks.

Figure 5:
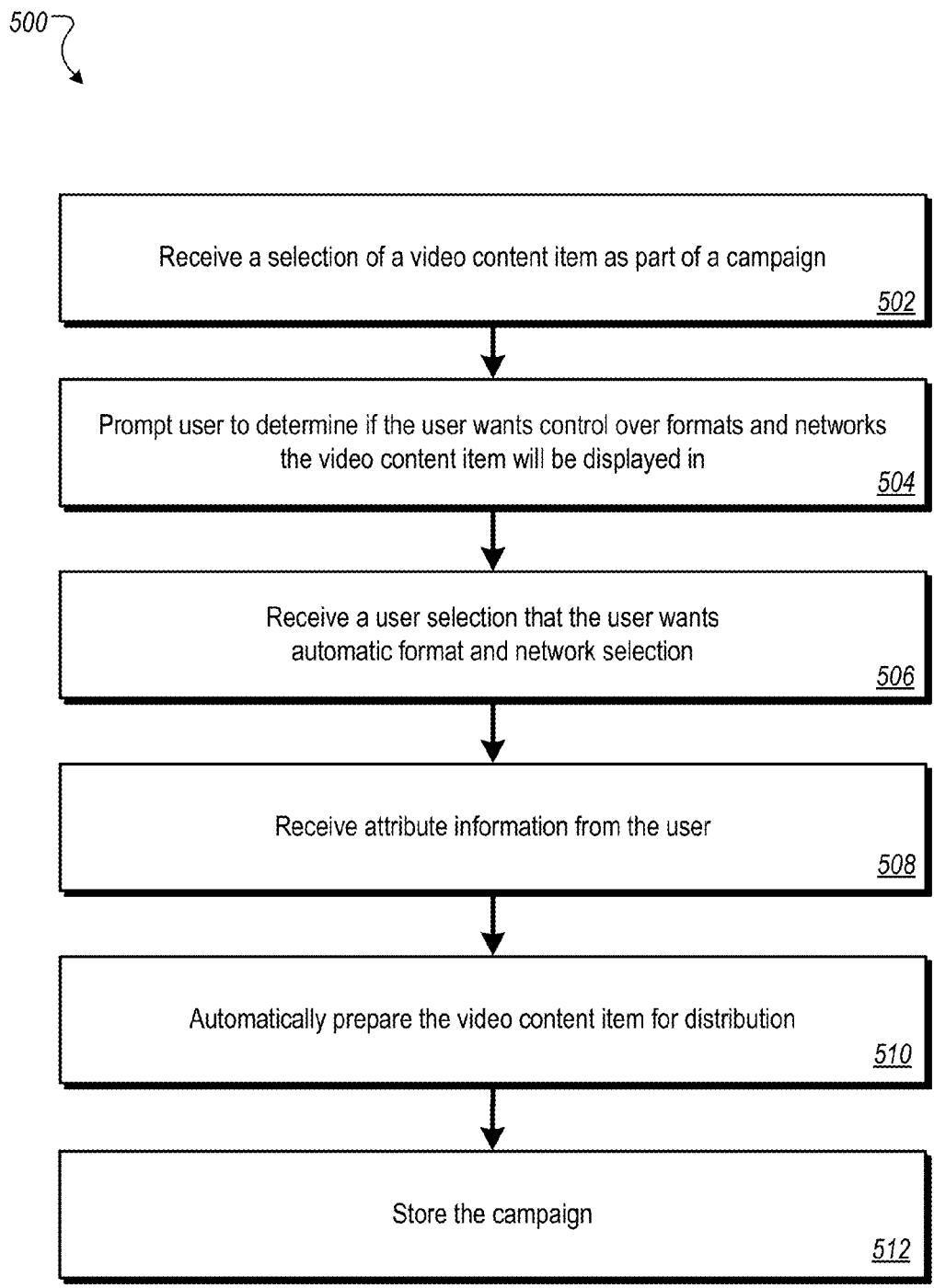
FIG. 5 is a flowchart of an example process for automatically preparing content.

FIG. 5 is a flowchart of an example process 500 for automatically preparing content. The process 500 can be performed, for example, by the content management system 110 described above with respect to FIG. 1.

A selection of a video content item is received for distribution by a content distribution system as part of a campaign (502). For example, with respect to FIG. 2, the user can select a video using the control 202.

A user is prompted to determine if the user wants control over formats and networks in which the video content item will be displayed (504). For example, with respect to FIG. 2, the user can be presented with the controls 204 and 212, where the user can select the control 212 if the user wants control over formats and networks the video content item will be displayed in and can select the control 204 if the user does not want control over formats and networks the video content item will be displayed in.

A user selection indicating that the user wants automatic format and network selection is received (506). For example, with respect to FIG. 2, the user can select the control 204.

Attribute information is received from the user for use in presenting the video content item in accordance with the received selection for automatic format and network selection (508). For example, with respect to FIG. 2, the user can provide attribute information using the controls 206, 208, and 210.

In some implementations, the video content item is automatically prepared for distribution in a predetermined number of formats and across a predetermined number of networks, including determining a distribution among the formats and the networks consistent with a first predetermined criteria (510). The pre-determined formats can include, for example, search-result-embedded format, selected-from-group format, in-display format, and stream-embedded format. The predetermined criteria can specify, for example, to deliver the video content consistent with campaign goals. For example, displaying a video in a first format and on a first network may be more advantageous towards meeting a campaign goal than displaying the video in a second format and on a second network. Accordingly, a larger portion of the campaign budget (e.g., larger bids) can be allocated to the first network and first format combination as compared to the second network and second format combination.

The campaign is stored (512). For example, one or more prepared video content items and campaign settings can be stored in the parameters data store 112.

Figure 6:
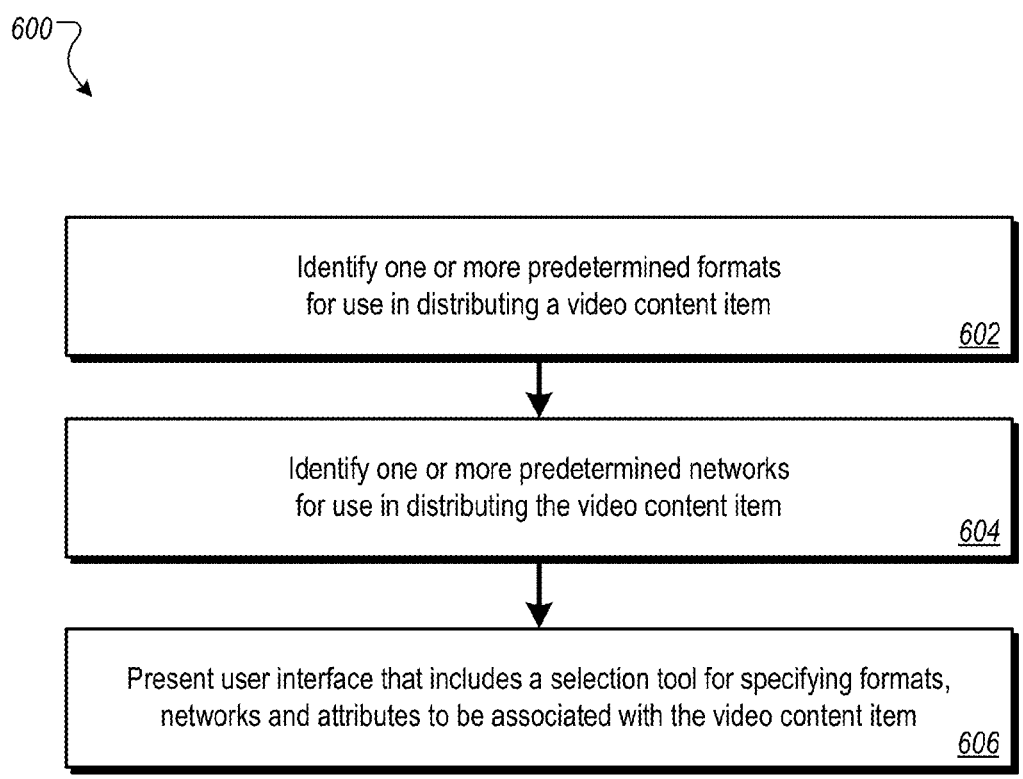
FIG. 6 is a flowchart of an example process for presenting a user interface for configuring video content distribution.

FIG. 6 is a flowchart of an example process 600 for configuring video content distribution. The process 600 can be performed, for example, by the content management system 110 described above with respect to FIG. 1.

One or more predetermined formats are identified for use in distributing a video content item by a content distribution system as part of a campaign (602). For example the content management system 110 can identify a search-result-embedded format, a selected-from-group format, an in-display format, and a stream-embedded format.

One or more predetermined networks are identified for use in distributing the video content item by the content distribution system as part of the campaign (604). For example, a video sharing network, a video search network, and a display network can be identified by the content management system 110.

Data is provided that cause presentation of a user interface (606), where the user interface includes a selection tool for specifying formats, networks and attributes to be associated with the video content item and used in the distribution of the video content item by the content distribution system and where the user interface includes a selectable control for enabling the user to designate automatic selection of the predetermined formats and predetermined networks for use in the campaign or manual configuration from among the predetermined formats and predetermined networks. For example, the user interfaces 200 and 300, described above with respect to FIGS. 2 and 3, can be displayed to a campaign sponsor.

Figure 7:
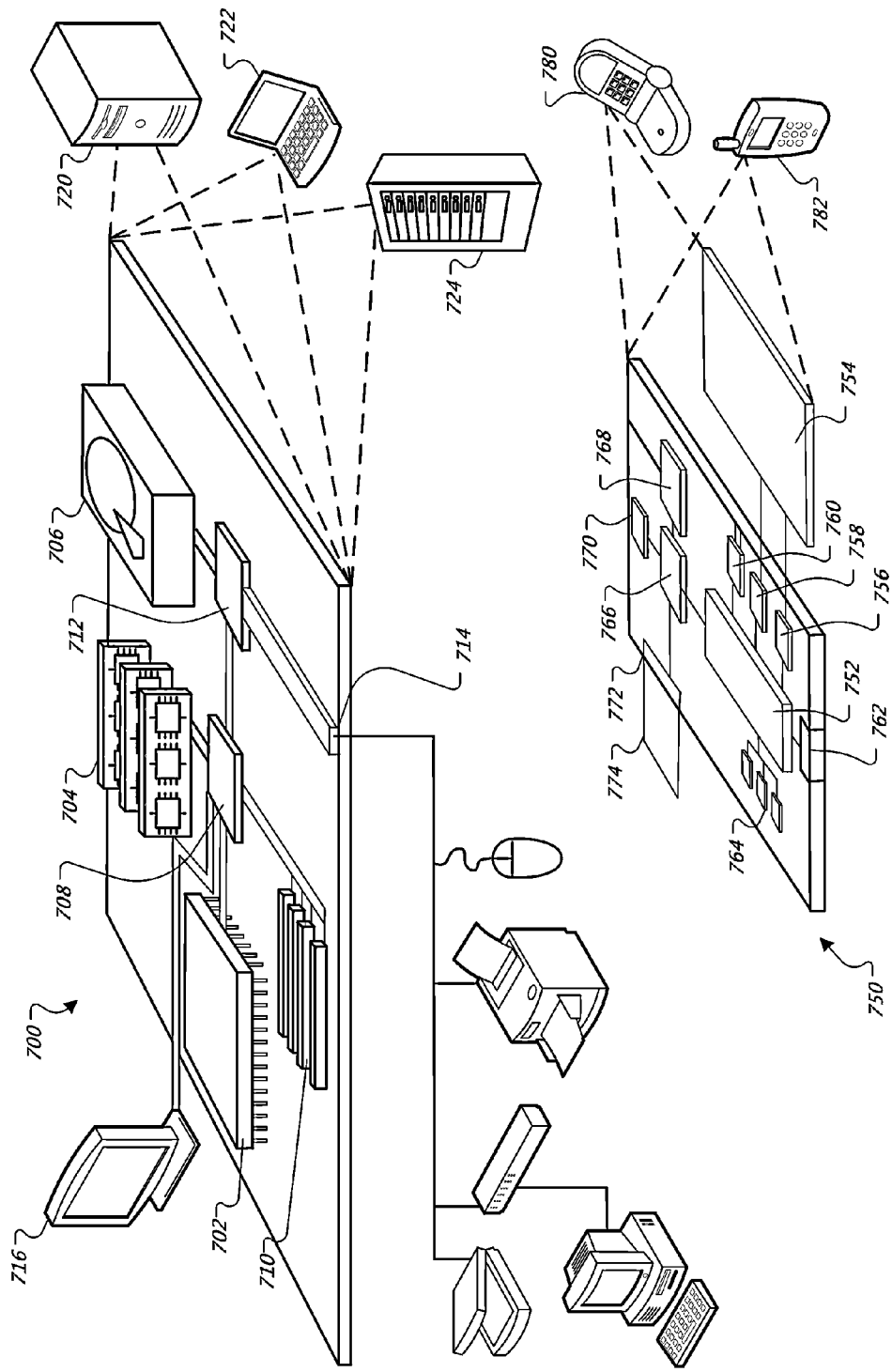
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
receiving, from a user of a content distribution system, a selection of a video content item for distribution by the content distribution system as part of a campaign, the user being a sponsor of the campaign;
receiving a user selection that the user wants automatic format and network selection;
receiving attribute information for the video content item from the user for use in presenting the video content item in accordance with the received selection for automatic format and network selection;
automatically preparing the video content item for distribution as part of the campaign in a predetermined number of formats and across a predetermined number of networks comprising determining a distribution among the formats and the networks; and
storing the campaign.

2. The method of claim 1, wherein the pre-determined formats are selected from the group of search-result-embedded format, selected-from-group format, in-display format, and stream-embedded format.

3. The method of claim 2, wherein the search-result-embedded format comprises video content items that comprise a user-selectable thumbnail image or icon that is embedded inside a search result.

4. The method of claim 2, wherein the selected-from-group format comprises video content items that are user-selectable from a group of thumbnails of video content items.

5. The method of claim 2, wherein the in-display format comprises video content items that appear as a user-selectable thumbnail within a banner or other display.

6. The method of claim 2, wherein the stream-embedded format comprises video content items that play before, during or after video content viewed by a user.

7. The method of claim 1, wherein determining a distribution comprises determining a distribution to deliver the video content consistent with campaign goals.

8. The method of claim 1, further comprising:
receiving a selection that the user wants control over at least a portion of the formats and the networks;
receiving a selection of one or more formats to exclude from a predetermined set of formats for the video content item; and
presenting a list of attributes required to be provided to complete the campaign;
wherein receiving attribute information from the user comprises input satisfying the list; and
wherein automatically preparing the video content item for distribution comprises preparing the video content item for distribution in only select ones of the predetermined set of formats.

9. The method of claim 1, further comprising:
receiving a selection that the user wants control over at least a portion of the formats and the networks;
receiving selections to exclude one or more of the predetermined networks; and
presenting a list of attributes required to be provided to complete the campaign;
wherein receiving attribute information from the user comprises input satisfying the list; and
wherein automatically preparing the video content item for distribution comprises preparing the video content item for distribution to only select ones of the predetermined set of networks.

10. The method of claim 1, further comprising:
receiving a selection that the user wants control over at least a portion of the formats and the networks;
receiving a selection of one or more formats to exclude from a predetermined set of formats for the video content item; and
displaying a filtered list of networks that comprises networks in the predetermined set of networks which support the selected formats.

11. The method of claim 10, further comprising:
receiving selections to exclude one or more of the networks in the filtered list of networks; and
presenting a list of attributes required to be provided to complete the campaign;
wherein receiving attribute information from the user comprises input satisfying the list; and
wherein automatically preparing the video content item for distribution comprises preparing the video content item for distribution in only the selected formats and to only the selected networks.

12. A computer-implemented method comprising:
identifying one or more predetermined formats for use in distributing a video content item by a content distribution system as part of a campaign;
identifying one or more predetermined networks for use in distributing the video content item by the content distribution system as part of the campaign; and
providing a user interface that comprises a selection tool for specifying formats, networks, and attributes to be associated with the video content item and used in the distribution of the video content item by the content distribution system, wherein the user interface comprises a selectable control for enabling the user to designate automatic selection of the predetermined formats and predetermined networks for use in the campaign or manual configuration of the campaign by manual selection from among the predetermined formats and predetermined networks.

13. The method of claim 12, wherein the pre-determined formats are selected from the group of search-result-embedded format, selected-from-group format, in-display format, and stream-embedded format.

14. The method of claim 13, wherein the search-result-embedded format comprises video content items that comprise a user-selectable thumbnail image or icon that is embedded inside a search result.

15. The method of claim 13, wherein the selected-from-group format comprises video content items that are user-selectable from a group of thumbnails of video content items.

16. The method of claim 13, wherein the in-display format comprises video content items that appear as a user-selectable thumbnail within a banner or other display.

17. The method of claim 13, wherein the stream-embedded format comprises video content items that play before, during or after video content viewed by a user.

18. The method of claim 12, further comprising:
receiving a selection that the user wants to manually configure at least a portion of the formats and the networks;
receiving a selection of one or more formats to exclude from a predetermined set of formats for the video content item;
presenting a list of attributes required to be provided to complete the campaign;
receiving attribute information from the user comprising receiving input satisfying the list; and
automatically preparing the video content item for distribution comprising preparing the video content item for distribution in only select ones of the predetermined set of formats.

19. The method of claim 12, further comprising:
receiving a selection that the user wants to manually configure at least a portion of the formats and the networks;
receiving selections to exclude one or more of the predetermined networks;
presenting a list of attributes required to be provided to complete the campaign;
receiving attribute information from the user comprising receiving input satisfying the list; and
automatically preparing the video content item for distribution comprising preparing the video content item for distribution to only select ones of the predetermined set of networks.

20. A non-transitory computer-readable medium containing instructions that, when executed by a processor, cause the processor to:
receive, from a user of a content distribution system, a selection of a video content item for distribution by the content distribution system as part of a campaign;
receive a user selection that the user wants automatic format and network selection;
receive attribute information for the video content item from the user for use in presenting the video content item in accordance with the received selection for automatic format and network selection;
automatically prepare the video content item for distribution as part of the campaign in a predetermined number of formats and across a predetermined number of networks comprising determining a distribution among the formats and the networks; and
store the campaign.

21. A system comprising:
a content distribution system;
a video sharing environment that hosts video content items that are viewable by user devices; and
an account management user interface for creating and managing content campaigns, the account management user interface being provided by the content distribution system;
wherein the account management user interface is configured, upon receiving a selection of a video content item for distribution by the content distribution system as part of a campaign, to receive a user selection that the user wants automatic format and network selection, and receive attribute information for the video content item from the user for use in presenting the video content item in accordance with the received selection for automatic format and network selection; and
wherein the content distribution system is configured to automatically prepare the video content item for distribution as part of the campaign in a predetermined number of formats and across a predetermined number of networks comprising determining a distribution among the formats and the networks, and to store the campaign.

* * * * *